(12) United States Patent
Boussant-Roux et al.

(10) Patent No.: US 8,303,889 B2
(45) Date of Patent: Nov. 6, 2012

(54) METHOD FOR MAKING A SIC BASED CERAMIC POROUS BODY

(75) Inventors: Yves Marcel Leon Boussant-Roux, Montfavet (FR); Ana-Maria Popa, Cavaillon (FR); Stephen D. Hartline, Shrewsbury, MA (US); Jostein Mosby, Mosby (NO); Sjur Vidar Velken, Kristiansand (NO)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 534 days.

(21) Appl. No.: 12/524,576

(22) PCT Filed: Jan. 28, 2008

(86) PCT No.: PCT/FR2008/050122
§ 371 (c)(1),
(2), (4) Date: Dec. 3, 2009

(87) PCT Pub. No.: WO2008/104656
PCT Pub. Date: Sep. 4, 2008

(65) Prior Publication Data
US 2010/0071328 A1    Mar. 25, 2010

(30) Foreign Application Priority Data
Jan. 29, 2007 (FR) .................. 07 52927

(51) Int. Cl.
C04B 33/32 (2006.01)
C04B 33/36 (2006.01)
C04B 35/64 (2006.01)

(52) U.S. Cl. ........ 264/628; 55/523; 55/DIG. 5; 264/630

(58) Field of Classification Search ........... 55/522–524, 55/DIG. 5; 422/169–172, 177–182; 60/297; 264/628, 630
See application file for complete search history.

(56) References Cited

U.S. PATENT DOCUMENTS

| 5,441,799 | A | 8/1995 | Owens et al. | |
|---|---|---|---|---|
| 6,214,078 | B1 * | 4/2001 | Way et al. | 55/523 |
| 7,524,350 | B2 * | 4/2009 | Kunieda | 55/523 |
| 7,985,274 | B2 * | 7/2011 | Barataud-Dien et al. | 55/523 |
| 2006/0179803 | A1 | 8/2006 | Ohno et al. | |
| 2006/0228521 | A1 * | 10/2006 | Ohno et al. | 428/117 |
| 2006/0281625 | A1 | 12/2006 | Kinoshita et al. | |
| 2007/0154728 | A1 * | 7/2007 | Ohno et al. | 428/593 |

FOREIGN PATENT DOCUMENTS

| EP | 1 666 433 | 6/2006 |
|---|---|---|
| WO | 93 25495 | 12/1993 |
| WO | 96 26910 | 9/1996 |
| WO | 03 022779 | 3/2003 |

* cited by examiner

*Primary Examiner* — Duane Smith
*Assistant Examiner* — Amber Orlando
(74) *Attorney, Agent, or Firm* — Oblon, Spivak, McClelland, Maier & Neustadt, L.L.P.

(57) ABSTRACT

The invention relates to a process for fabrication of a porous refractory ceramic product made from SiC, by heat treatment and sintering at high temperature, starting from a fraction of fine particles of SiC and from a fraction of larger-sized particles of SiC, said process being characterized in that, in a step preliminary to the heat treatment and to the sintering at high temperature, the finest particles of SiC are agglomerated then, in a second step, the granules thus obtained are added to the SiC powder with particles of larger size.
The invention also relates to a porous body made from recrystallized SiC in an essentially α form, in particular a particulate filter for automobile application, obtained by such a process.

19 Claims, No Drawings

METHOD FOR MAKING A SIC BASED CERAMIC POROUS BODY

CROSS-REFERENCE TO RELATED APPLICATIONS

This application is a National Stage of PCT/FR08/0501222 filed Jan. 28, 2008 and claims the benefit of FR0752927 filed Jan. 29, 2007.

The present invention relates to the field of porous materials made from silicon carbide, in particular from recrystallized silicon carbide. More particularly, the invention relates to a method for fabricating a body or an element formed from such a porous material and whose characteristics of porosity, of pore size and of mechanical resistance are improved. Such a body or element can notably be used in the field of filtration or of heat treatment substrates or of ceramic lighters for example.

Porous ceramic or refractory materials made from silicon carbide or SiC obtained by sintering at high temperature are increasingly used in applications where their high chemical inertia and their high refractoriness allow them to withstand high mechanical demands, in particular thermo-mechanical demands. Important but non-limiting examples are typically applications such as the particulate filter in exhaust lines of automobile vehicles. For example, the increase in the porosity and, in particular, in the average size of the pores is thus generally sought for catalytic filtration treatment applications for gases, the deposition of the catalytic coating onto the porous material being made possible by the fact that the material exhibits, after said deposition, a porosity that is still sufficient to allow the passage of the gases without excessive loading loss.

However, on the porous bodies formed from such materials, significant local variations in distribution of pores and in mechanical resistance have been observed. Such defects may notably occur due to local variations in the temperature at certain locations on the element during its fabrication, these variations being inherent in any high-temperature heat treatment process and therefore very difficult to control. When the material is highly porous, in other words when its open porosity is greater than 40%, or even 45% or 50%, this phenomenon is further accentuated and regions of reduced mechanical and/or thermo-mechanical resistance may lead to a rapid deterioration of the material in use.

In an identical manner, for a material designed for example to be used as heat treatment substrate, it is important to control as far as possible the porosity in order to decrease the thermal mass of the substrate while at the same time preserving its mechanical and thermo-mechanical characteristics.

In addition, wide variations in the distribution of pore sizes in the material forming the element furthermore have a detrimental effect in gas or liquid filtering applications because the loading loss when the fluid flows through the element is not then well controlled.

Similarly, an uncontrolled pore size distribution may constitute a critical defect that will limit the lifetime of a heat treatment substrate.

In order to better control the microstructure and the uniformity of a porous material, the most conventional means known consists in using a porogenic agent, typically of organic origin, which is decomposed during a heating step or when the material is heat-treated. Such a method is for example described in the application EP 1 403 231. In a known manner, the use of a porogenic agent however leads to a release of toxic gases and can furthermore cause defects in the material such as micro-cracking if the elimination of the porogenic agent is not perfectly controlled. Such defects can then be very damaging for the properties and the resistance of the porous bodies during their use, especially for particulate filters in an exhaust line that are subjected to successive filtration and regeneration phases or for a heat treatment substrate which will have to undergo several wide thermal cycles.

The dispersion of these porogenic agents within the initial mixture used for the shaping of the porous body is even more problematic when the quantity of porogenic agent added exceeds a few percent by weight of the total initial mixture, in other words particularly when a highly porous product, in the sense previously described, is sought. In the particular case of ceramics essentially composed of SiC obtained by recrystallization between around 1900 and 2300° C., it has furthermore been observed that the presence of residues associated with the decomposition of the porogenic agent, such as residual carbon, leads to an imperfect consolidation of the porous materials during the heat treatment.

On the other hand, it is also known that, in order to increase the mean pore diameter of the final product, the size of the particles of SiC present in the initial mixture should be increased. The use of large-sized particles, in other words whose median diameter is typically greater than 20 microns, leads however to a decrease in the pore volume and, under equivalent heat treatment conditions, a fairly abrupt deterioration in the mechanical properties of the element after heat treatment. Moreover, it becomes difficult, or even impossible, to determine a heat treatment temperature that allows, at the same time, a pore volume, a distribution of pore sizes and a mechanical resistance to be conserved that are suitable for applications such as, for example, the filtration of hot gases in an automobile exhaust line.

There exists therefore a need for a porous material exhibiting, on the one hand, a better compromise in terms of pore diameter, porosity volume and mechanical resistance and, on the other, a reduced variation in its median pore size and in its mechanical resistance as a function of the heat treatment temperature.

The aim of the present invention is to provide such a porous material exhibiting an improved compromise between its mechanical resistance and its degree of porosity. More particularly, the aim of the invention is to provide a new fabrication process for a porous ceramic or refractory product made from SiC, sintered at a temperature higher than 1600° C., allowing a material to be obtained that exhibits an improved compromise, with respect to the processes known up to now, between its porosity properties, in particular its open porosity and/or its median pore diameter, and its mechanical resistance properties.

More precisely, the invention relates to a process for fabrication of a sintered porous body made from SiC, comprising the following steps:

a) mixing of a first powder of SiC particles, whose median diameter is less than 20 µm, in a solvent such as water and in the presence of a binder, b) agglomeration of said particles in order to form granules whose average size is in the range between 5 and 500 µm, c) mixing of the granules coming from step b) with a second powder of SiC particles whose median diameter is greater than 5 µm and at least twice that of the first powder, in the presence of a solvent such as water and of a binder, in proportions designed to allow the shaping of the mixture, d) shaping of the mixture obtained during step c) so as to obtain a hollow body, e) elimination of the solvent and/or of the binders by thermal treatment and/or by use of microwaves, f) heat treatment of the body at a sintering temperature in the range between 1600° C. and 2400° C., preferably higher than 1700° C., in order to obtain a sintered porous body.

The process according to the invention therefore consists in agglomerating in a preliminary step the finest particles of SiC, then in adding in a second step the granules thus obtained to an SiC powder containing larger-sized particles, and advantageously allows, after heat treatment and sintering at high temperature, a porous refractory ceramic product made from SiC to be obtained whose porosity and mechanical resistance characteristics are improved and can be more easily controlled. Thus, the process according to the invention allows a porous sintered body to be obtained with a guaranteed relatively high mechanical resistance, whatever the desired value of its porosity.

Advantageously, the median diameter of the particles of the first SiC powder is less than 10 microns, and preferably less than 5 µm, or even less than 1 µm staying within the scope of the invention, the median diameter of the particles of the first SiC powder may be of the order of a few tens of nanometers, or even of the order of a few nanometers, for example of the order of 1 to 100 nm.

According to one possible embodiment of the present invention, said first SiC powder may be composed of several fractions differing by the median diameter of the particles forming them. For example, one of these fractions forming the first powder can be composed of particles whose median diameter is of the order of 1 to 20 microns and another fraction composed of particles of nanometric size, in the sense previously described.

The median diameter of the particles forming the second SiC powder can be in the range between 5 and 50 µm, and preferably in the range between 5 and 20 µm. Below 5 µm, no significant difference has been observed with respect to porous materials obtained according to the conventional processes. Above 50 µm, the mechanical resistance of the porous body decreases very sharply.

For example, in one process according to the invention, the median diameter of the SiC particles of the second powder is at least five times greater than the median diameter of the SiC particles of the first powder and, preferably, at least ten times greater.

Typically, step b) for agglomeration is performed under conditions allowing granules whose size is in the range between 5 and 200 µm, preferably between 10 and 100 µm and, most preferably, between 10 and 50 µm, to be obtained. When the size of the granules is too small, no technical effect has been observed. When the average size of the granules exceeds 200 µm, for example up to 500 µm, the mechanical resistance of the final porous product becomes significantly inferior, the decrease in the mechanical resistance to bending rupture observed being of the order of 5 to 10 MPa.

Generally speaking, in the mixture in step c), the fraction of granules represents between 95 and 5% by weight of the dry mixture and, preferably, between 90 and 10% by weight of the dry mixture.

In order to notably increase the electrical conductivity properties of the porous body or to reinforce the mechanical resistance of the porous body, the SiC powder can be SiC doped with Aluminum.

Typically, the binder used for the fabrication of the granules, in particular during steps a) and/or c) is for example a thermo-hardening resin chosen from amongst the resins epoxy, silicone, polyimide, polyester or, preferably, phenolic resin, a PVA or an acrylic resin preferably chosen for reasons associated with the respect of the environment. The nature of the binder and its quantity are, in general, chosen as a function of the granulometry of the initial powders of fine particles of SiC and of the desired size of SiC granules obtained after agglomeration. The binder must allow a sufficient mechanical strength to be provided so that the granules are not degraded prior to the thermal de-binding treatment (step e)) and, in particular, during the shaping operation (step d)).

The binder of the acrylic resin type has, for example, the advantage of leading to an SiC slurry prior to agglomeration of the granules of low viscosity, for an identical granule composition and agglomeration process, and subsequently leads to very uniform granules notably exhibiting a superior cohesion under the effect of the stresses from shaping of the mixture with a solvent such as water during step c) of the present process. This presents a particular advantage for example when the granules comprise nuclei formed by the grains of a third powder of SiC particles of larger diameter than that of the first SiC powder but smaller than that of the second SiC powder, such as was previously defined. The organic binder may also, according to the invention, be associated with a binder of the mineral or organo-mineral type typically comprising an element such as aluminum and/or silicon. In certain embodiments of the invention, only one binder of the mineral or organo-mineral type could also be used. In the presence of such binders and when the thermal treatment is carried out under an oxidizing atmosphere, the thermal treatment is then adapted according to routine techniques in order to limit the oxidation of the finest particles of SiC.

According to the invention, it is also possible to add dispersing agents or deflocculants to the binder in steps a) and/or c).

The purpose of these dispersing agents or deflocculants is to avoid the agglomeration of the powders in the suspension before, for example, the thermal treatment for elimination of the solvent. According to the invention, any of the known dispersing agents may be used, of the pure ionic type, for example the metal polyphosphates, or of the steric effect type only, for example the sodium polymethacrylates or combining the two functions as long as their quantity remains low with respect to the quantity of SiC particles (in other words typically less than 1% of the mass of the particles). Remaining within the scope of the invention, the granules may also comprise sintering additives such as for example within the group Si and/or Aluminum and/or Boron and/or a carbon powder and/or other powders for example formed from refractory oxides or from alkaline metals or from rare earths. These additives can contribute to enhancing the cohesion of the granules after thermal treatment and before addition into the mixture for fabrication of the porous bodies and contribute to the improvement of the mechanical characteristics of the porous bodies. An additive of the AlN type, with or without preliminary thermal treatment of the granules, is a preferred additive. An additive of the silica smoke type, with or without preliminary thermal treatment of the granules, is also a preferred additive.

Typically, step b) for agglomeration can be implemented:
preferably by atomization or another process involving a pulverization through at least one nozzle of a colloidal suspension (or slurry) inside a container into which a jet of hot air or of inert gas under pressure is blown, in such a manner as to obtain uniform aggregates of grains of ceramic powder coated with organic products, by granulation, the agglomeration of the grains of ceramic powder being brought about mixing and drying of a wet mixture inside a mixer.

In particular, in the case of atomization, parameters such as the size, and in particular the diameter, of the slurry and drying fluid inlet nozzle, the pressure of the jet of the drying fluid and the injection of the slurry, the speed of the rotation of the nozzles where these are mobile, will be regulated according to the techniques of the prior art, which are well known in the field, in order to adjust the shape, the average size and the size distribution of the granules sought.

Preferably, the granules used during step c) are selected such that their population exhibits a relatively narrow size dispersion around an average size. This selection is for example performed using a selection process by sifting or classification of the granules, following their fabrication process. Indeed, it has been observed by the applicant that a size of granules with little or no dispersion around a mean value resulted at the end in a more uniform product in terms of microstructure being obtained, offering superior porosity and mechanical resistance characteristics. For example, the standard deviation around the median value of the diameters of particles of the fraction is at most around 15%.

The granules are preferably porous and have a porosity in the range between 5 and 95%. After drying and/or thermal treatment, the granules according to the invention advantageously exhibit a residual water content of less than 1%. According to the invention, in the mixture in step c), the fraction of granules represents between 95 and 5% by weight, and preferably between 90 and 10% by weight, of the dry mixture. The mass of granules is typically in the range between 5 and 100% by weight of the mixture (measured on a dry sample) prior to the shaping operation (step d)).

During step c), binding and/or plastifying agents may be added. These are for example chosen from amongst the range of polysaccharides and cellulose derivatives, PVAs, PEGs, or even lignone derivatives or chemical setting agents such as phosphoric acid or sodium silicate, as long as these are compatible with the heat treatment process. The applicant has observed that the rheology of the plastic mixture thus obtained could easily be controlled by routine experimentation, including for significant additions of water. Although not necessary according to the invention, it is possible to add porogenic agents to the mixture, but whose quantity is greatly reduced with respect to the processes of the prior art.

The shaping of the porous product (step d)) is preferably performed in such a manner as to form objects of various shapes according to any known technique, for example by pressing, extrusion, vibration and/or molding, by casting—under pressure or otherwise—for example in a porous plaster or resin mold. The size of the granules and of the fraction of SiC particles forming the second powder is adapted according to the techniques currently used to the thickness of the object to be formed in such a manner as to ensure the properties of porosity, of mechanical resistance and of aspect required for the desired application. Furthermore, it has been observed that the reduction of the fraction of fine particles, agglomerated in the form of granules according to the invention, allowed the blockage of the molds during molding to be avoided or reduced the effects of delamination in the case of the pressing mixtures.

The elimination of the solvent during step e) can be obtained by a thermal treatment or, alternatively, by the use of microwaves, for a period of time sufficient to bring the content of water not chemically bonded to less than 1% by weight. It is of course possible to envision the use of other equivalent known means while still remaining within the scope of the present invention.

The elimination of the binder, or de-binding process (step e)), is preferably performed under air and at a temperature preferably lower than 700° C., in such a manner as to ensure a sufficient mechanical strength prior to the sintering process and to avoid an uncontrolled oxidation of the SiC.

The heat treatment is carried out at high temperature, in other words at a temperature higher than 1600° C., and preferably higher than 2100° C. but lower than 2400° C. Preferably, said heat treatment is conducted under a non-oxidizing atmosphere, for example of Argon.

The invention also relates to a porous body made from recrystallized SiC, in an essentially α form, obtained by a process such as was previously described, and its use as a structure for a particulate filter in an exhaust line of a diesel or petrol engine or as a heat treatment substrate or ceramic lighter.

By comparison with a porous body of the same shape and with comparable porosity characteristics, but obtained according to a prior art process in which the porosity is exclusively obtained by additions of porogenic agent, the porous body formed by the present process, including a granulation step able to be undertaken without addition of porogenic agent, presents the following advantages:

a higher characteristic MOR×PO value (bending modulus of rupture multiplied by the open porosity volume) representing a better compromise between the porosity properties and the mechanical resistance properties, a median pore diameter and a mechanical resistance with less variation as a function of the heat treatment final temperature.

Now, by comparison with a porous body of the same shape, of similar porosity obtained by a process in which the high porosity is obtained by introduction into the initial mixture of a fraction of particles of larger size, without addition of porogenic agent, the porous body obtained according to the present process exhibits significantly higher mechanical resistance characteristics. In a decisive manner, it is observed that the value of the product MOR×PO (bending modulus of rupture multiplied by the open porosity volume), which represents a better compromise between mechanical resistance and porosity, is also much higher for the porous body according to the invention.

It has also been observed, in the more specific case of SiC ceramic products obtained by recrystallization, that the use of granules obtained by agglomeration of the finest particles of SiC, associated with the use of a fraction of SiC particles of larger size, allowed the open porosity and median pore diameter to be increased and to be controlled, while at the same time maintaining the mechanical resistance of the material.

The advantages previously described are illustrated by the non-limiting examples that follow, illustrating certain embodiments of the invention. The following examples allow a comparison to be made with the products obtained according to the prior art processes.

More particularly, the examples 1, 2, 3 and 2b illustrate comparative examples. The examples 4 to 12 are examples according to the invention.

In all the examples, the granules were prepared starting from a mixture of 50% by weight of a silicon carbide powder with a median diameter of 0.5 μm and 50% by weight of water, to which 5% by weight of PVA was added.

In the particular case of the example 11, the granules D were formed with a silicon carbide powder doped with 1% of Al. In the particular case of the example 12, 8% by weight, expressed as a percentage of the silicon carbide total mass content of the granules, was substituted by a silicon carbide powder of nanometric size having a specific surface area of 60 m$^2$/g.

The temperature of the hot air of the atomizer used for the granulation step was regulated to 180° C., whereas the temperature of the gases at the extraction point were 80° C. The air flow was 3000 Nm$^3$/h. The diameter of the pulverization nozzle for the slurry was 1 mm for an injection pressure of 30 bars. The granules produced are of virtually spherical shape and have an average size of around 100 μm. A classification by vibrating sieve allowed three different granulometric fractions to be selected, of mean diameters substantially equal to 20 μm (fractions A, D, E), 30 μm (fraction B) and 45 μm (fraction C).

The mixtures were constituted according to the mass compositions indicated in the attached table 2 with various average sizes of granules, various median diameters of SiC powders, with the addition of plastifying binder of the methylcellulose type and, depending on the cases, with the addition of organic porogenic agent of the polyethylene type. The mixtures were mixed for 10 minutes in the presence of water in a mixer until a uniform paste was obtained. The paste is drawn for 30 minutes so as to render the paste plastic and to allow the de-aeration of the mixture.

The additions of water, of porogenic agent and of binder-plastifier are expressed in table 1 with respect to the mass of dry mixture.

In the framework of the examples 1 and 4, bars of material were extruded by means of an extrusion die of rectangular shape with internal dimensions substantially equal to 6 mm and 8 mm, in such a manner as to form pieces of parallelepiped shape with dimensions 6 mm×8 mm×60 mm.

In the framework of the other examples, monolithic structures in the form of a honeycomb were extruded by means of an extrusion die of appropriate shape allowing the dimensional characteristics of the structure after extrusion to be obtained according to the following table 1:

TABLE 1

| Geometry of the channels and of the monolithic structure | square |
|---|---|
| Density of channels | 180 cpsi (channels per sq inch, 1 inch = 2.54 cm), being 27.9 channels/cm$^2$ |
| Internal thickness of the walls | 350 μm |
| Mean external thickness of the walls | 600 μm |
| Length | 17.4 cm |
| Width | 3.6 cm |

According to the techniques of the prior art, for example described in the patents EP 1 403 231, EP 816 065, EP 1 142 619, EP 1 455 923 or again WO 2004/090294, these extruded products were dried at 110° C., de-bound at 600° C./air and heat treated under Argon at high temperature according to a plateau of 6 hr.

Porosity and mechanical resistance characteristics have been determined on bars or monolithic structures and are expressed in table 2 as a function of the maximum heat treatment temperature.

The open porosity is measured on the bars and the monolithic structures extruded in the form of a honeycomb by immersion and void according to the ISO5017 standard. The median pore diameter is measured by mercury porometry.

The force at rupture MOR is measured at room temperature for each example on 10 test samples corresponding to single elements (monolithic structures) from the same fabrication batch of dimensions 17.4 cm in length and 36 mm in width. The 4-point flexion assembly is designed with a distance of 150 mm between the two lower pressure points and a distance of 75 mm between the two upper needle points typically according to the ASTM C1161-02.c standard. Rubber pieces are placed on the needle points in order to avoid initiating cracking by compression on the upper face of the test sample, which could be detrimental to the quality of the measurements. The speed of descent of the needle point is constant and around 10 mm/min.

The force at rupture on bars is measured on extruded samples with dimensions 6×8 mm$^2$ and of length 60 mm with a 3-point flexion according to the ISO5014 standard. The main characteristics and results obtained for the filters according to the examples 1 to 12 are grouped together in table 2.

The comparison of the examples 4 and 1 shows a significant improvement in the resistance/porosity, compromise measured by the factor (MOR×PO), together with a more limited variation in the porosity, median pore diameter and mechanical resistance characteristics as a function of the heat treatment temperature, when a process according to the invention is implemented.

The comparison of the examples 5 and 3 shows that a better porosity/mechanical resistance compromise is obtained when a process according to the invention is used, with respect to a prior art process including the use of large quantities of porogenic agents.

The composition with reference 2 does not allow a ceramic product with high porosity to be obtained, the open porosity being less than 40%.

The examples 5, 5b, 6 and 7 show variants of the invention as a function of the granular size and of the granulometric composition.

The example 8 shows, surprisingly and by comparison with the example 2b, that the mechanical resistance of the porous body obtained according to the invention can be substantially maintained, even if the size of the SiC particles forming the second powder is increased. The results of the tests for the example 8, reported in the attached table, show in particular that a very large mean pore diameter can be obtained according to the invention without substantial degradation of the mechanical properties of the porous body.

The examples 9 and 10 show that a high proportion of granules according to the invention allow a product with very high porosity to be obtained while at the same time maintaining a satisfactory mechanical resistance.

The examples 11 and 12 allow monolithic structures to be obtained with properties substantially similar to the example 5b, but at a lower heat treatment temperature.

TABLE 2

| Compositions by mass | reference 1 mixture without granules with PFA bars | invention 4 mixture with granules without PFA bars | reference 2 mixture without granules without PFA monolith | invention 3 mixture without granules with PFA monolith | reference 5 mixture with granules without PFA monolith | invention 5b mixture with granules without PFA monolith | reference 6 mixture with granules without PFA monolith |
|---|---|---|---|---|---|---|---|
| SiC powder $d_{50}$ = 35 μm | | | | | | | |
| SiC powder $d_{50}$ = 10 μm | 70 | 70 | 70 | 70 | 70 | 70 | 70 |
| SiC fine particles $d_{50}$ = 0.5 μm | 30 | | 30 | 30 | 10 | 10 | 10 |
| SiC fine particles, granules A (average size = 20 μm) | | 30 | | | | 20 | |
| SiC fine particles, granules B (average size = 30 μm) | | | | | 20 | | |
| SiC fine particles, granules C (average size = 45 μm) | | | | | | | 20 |
| SiC fine particles, granules D with Al-doped SiC (average size = 20 μm) | | | | | | | |
| SiC fine particles, granules E with addition of nano powder (average size = 20 μm) | | | | | | | |
| porogenic agent of the polyethylene type $D_{50}$ = 25 μm | +5 | | | +5 | | | |
| shaping additive of the methyl-cellulose type | +10 | +10 | +10 | +10 | +10 | +10 | +10 |
| addition of water % | +22 | +22 | +22 | +22 | +20 | +21 | +25 |
| after heat treatment 2000° C./Ar/6 h | | | | | | | |
| PO % (PO = porosity) | 46.5 | 49 | | | | | |
| $D_{50}$ of the pores μm | 6.5 | 8.7 | | | | | |
| MOR (MPa) | 20 | 24 | | | | | |
| MOR * PO (MPa. %) | 977 | 1205 | | | | | |
| after heat treatment 2100° C./Ar/6 h | | | | | | | |
| PO % | 49 | 50.6 | 35 | 46 | 42 | 45 | 45 |
| $D_{50}$ of the pores μm | 12.5 | 14.0 | 10.0 | 14.0 | 12.0 | 13.0 | 15.0 |
| MOR (MPa) | 25 | 30 | 22 | 18 | 25 | 23 | 20 |
| MOR * PO (MPa. %) | 1225 | 1518 | 770 | 828 | 1050 | 1035 | 900 |
| after heat treatment 2200° C./Ar/6 h | | | | | | | |
| PO % | 51 | 51 | | | | | |
| $D_{50}$ of the pores μm | 19.0 | 23.1 | | | | | |
| MOR (MPa) | 34 | 35 | | | | | |
| MOR * PO (MPa. %) | 1734 | 1785 | | | | | |
| variation as a function of the heat treatment temperature | | | | | | | |
| average of PO % | 48.8 | 50.2 | | | | | |
| average of $D_{50}$ of the pores μm | 12.7 | 15.3 | | | | | |

| Compositions by mass | invention 7 mixture with granules without PFA monolith | reference 2b mixture without granules without PFA monolith | invention 8 mixture with granules without PFA monolith | reference 9 mixture with granules without PFA monolith | invention 10 mixture with granules without PFA monolith | reference 11 mixture with granules without PFA monolith | invention 12 mixture with granules without PFA monolith |
|---|---|---|---|---|---|---|---|
| SiC powder $d_{50}$ = 35 μm | | 70 | 70 | | | | |
| SiC powder $d_{50}$ = 10 μm | 50 | | | 25 | 25 | 70 | 70 |
| SiC fine particles $d_{50}$ = 0.5 μm | 20 | 30 | 10 | 10 | 10 | 10 | 10 |
| SiC fine particles, granules A (average size = 20 μm) | | | | | | | |
| SiC fine particles, granules B (average size = 30 μm) | | | | 65 | | | |
| SiC fine particles, granules C (average size = 45 μm) | 30 | | 20 | | 65 | | |
| SiC fine particles, granules D with Al-doped SiC (average size = 20 μm) | | | | | | 20 | |
| SiC fine particles, granules E with addition of nano powder (average size = 20 μm) | | | | | | | 20 |
| porogenic agent of the polyethylene type $D_{50}$ = 25 μm | | | | | | | |
| shaping additive of the methyl-cellulose type | +10 | +10 | +10 | +10 | +10 | +10 | +10 |
| addition of water % | +20 | +28 | +23 | +24 | +25 | +23 | +24 |
| after heat treatment 2000° C./Ar/6 h | | | | | | | |
| PO % (PO = porosity) | | | | | | 46 | 45.5 |
| $D_{50}$ of the pores μm | | | | | | 9 | 9.5 |

TABLE 2-continued

| | | | | | | |
|---|---|---|---|---|---|---|
| MOR (MPa) | | | | | | 30 | 29 |
| MOR * PO (MPa. %) | | | | | | 1380 | 1320 |
| after heat treatment 2100° C./Ar/6 h | | | | | | | |
| PO % | 49 | 37 | 47 | 61 | 60 | | |
| D$_{50}$ of the pores μm | 17.0 | 35.0 | 41.0 | 23.5 | 24.0 | | |
| MOR (MPa) | 21 | 7 | 20 | 29 | 27 | | |
| MOR * PO (MPa. %) | 1029 | 259 | 940 | 1769 | 1620 | | |
| after heat treatment 2200° C./Ar/6 h | | | | | | | |
| PO % | | | | | | | |
| D$_{50}$ of the pores μm | | | | | | | |
| MOR (MPa) | | | | | | | |
| MOR * PO (MPa. %) | | | | | | | |
| variation as a function of the heat treatment temperature | | | | | | | |
| average of PO % | | | | | | | |
| average of D$_{50}$ of the pores μm | | | | | | | |

The invention claimed is:

1. The process for fabricating a sintered porous body, comprising:
   a) mixing a first powder of SiC particles, whose median diameter is less than 20 μm, in a solvent and in the presence of a binder,
   b) agglomerating said particles in order to form granules whose average size is in a range between 5 and 500 μm,
   c) mixing the granules from b) with a second powder of SiC particles whose median diameter is greater than 5 μm and at least twice that of said first powder, in the presence of a solvent and of a binder, in proportions designed to allow shaping of the mixture,
   d) shaping the mixture obtained during c) so as to obtain a hollow body,
   e) eliminating the solvent and the binders from the body by thermal treatment and/or by use of microwaves, and
   f) heat treating the body at a sintering temperature in a range between 1600° C. and 2400° C. in order to obtain a sintered porous body.

2. The process as claimed in claim 1, in which the median diameter of the particles of said first SiC powder is less than 10 microns.

3. The process as claimed in claim 1, in which the median diameter of the particles of the second SiC powder is in a range between 5 and 50 μm.

4. The process as claimed in claim 1, in which the median diameter of the particles of the second SiC powder is at least five time greater than the median diameter of the SiC particles of said first powder.

5. The process as claimed in claim 1, in which agglomerating is performed under conditions allowing granules whose size is in the range between 5 and 200 μm-to be obtained.

6. The process as claimed in claim 1, in which, in the mixture of granules and particles, the fraction of granules represents between 95 and 5% by weight of the dry mixture.

7. The process as claimed in claim 1, in which said first SiC powder is composed of several fractions which differ by the median diameter of the particles forming them, one of these fractions formed by particles whose median diameter is of the order of 1 to 20 microns and another fraction formed by particles of nanometric size.

8. The process as claimed in claim 1, in which the binder in a) or c) is formed by a thermo-hardening resin, silicone, polyimide, polyester, a phenolic resin, PVA, optionally associated with a mineral or organo-mineral binder or an acrylic resin.

9. The process as claimed in claim 1, in which a dispersing agent or a deflocculant is added to the binder in a) and/or c).

10. The process as claimed in claim 1, in which agglomerating is implemented by atomization or by granulation.

11. The process as claimed in claim 1, in which the shaping of the hollow body in d) is obtained by pressing, extrusion, vibration or by molding, or casting under pressure or otherwise, in a porous plaster or resin mold.

12. The process as claimed in claim 1, wherein the solvent in a) is water.

13. The process as claimed in claim 1, wherein the solvent in c) is water.

14. The process as claimed in claim 1, wherein the median diameter of the particles of said first SiC powder is less than 5 microns.

15. The process as claimed in claim 1, wherein the median diameter of the particles of said first SiC powder is less than 1 micron.

16. The process as claimed in claim 1, in which the median diameter of the particles of the second SiC powder is in a range between 5 and 20 μm.

17. The process as claimed in claim 1, in which the median diameter of the particles of the second SiC powder is at least ten times greater than the median diameter of the SiC particles of said first powder.

18. The process as claimed in claim 1, in which agglomerating is performed under conditions allowing granules whose size is in the range between 10 and 50 μm to be obtained.

19. The process as claimed in claim 1, in which, in the mixture of granules and particles, the fraction of granules represents between 90 and 10% by weight of the dry mixture.

* * * * *